United States Patent [19]
Cravy et al.

[11] Patent Number: 5,544,977
[45] Date of Patent: Aug. 13, 1996

[54] POLYMERIC PIPE SPLITTER, REPLACEMENT TOOL AND METHOD

[75] Inventors: Jerald A. Cravy, Balch Springs; Clarence D. McCall, Arlington, both of Tex.

[73] Assignee: Lone Star Gas Company, Dallas, Tex.

[21] Appl. No.: 265,091

[22] Filed: Jun. 24, 1994

[51] Int. Cl.⁶ ........................................ F16L 55/18
[52] U.S. Cl. .............................. 405/154; 166/55; 30/92.5
[58] Field of Search ....................... 405/156, 157, 405/154, 155, 184, 303, 232; 30/92.5; 166/55-55.7

[56] References Cited

U.S. PATENT DOCUMENTS

| | | |
|---|---|---|
| 652,367 | 6/1900 | Law . |
| 928,361 | 7/1909 | Cockburn . |
| 1,001,205 | 8/1911 | Lovell . |
| 1,519,882 | 12/1924 | Stewart et al. . |
| 1,618,368 | 2/1927 | Dietle . |
| 1,638,494 | 2/1925 | Lewis et al. . |
| 1,717,588 | 6/1929 | Small . |
| 2,502,711 | 4/1950 | Evans ........................... 7/14.1 |
| 2,628,165 | 5/1953 | Barber ......................... 164/0.3 |
| 2,834,106 | 5/1958 | Conder ......................... 30/91 |
| 2,947,253 | 8/1960 | Cirilo ......................... 102/20 |
| 2,983,042 | 5/1961 | Frantz et al. ................... 30/91 |
| 3,005,493 | 10/1961 | Crowe et al. .................. 166/55 |
| 3,023,040 | 2/1962 | Cawley et al. ................ 287/119 |
| 3,073,389 | 1/1963 | Conner ....................... 166/55.8 |
| 3,181,302 | 5/1965 | Lindsay . |
| 3,543,377 | 12/1970 | Bremner ....................... 29/234 |
| 4,003,122 | 1/1977 | Overmyer et al. .............. 29/429 |
| 4,100,980 | 7/1978 | Jenne ........................... 175/19 |
| 4,118,940 | 10/1978 | Beane .......................... 405/174 |
| 4,505,302 | 3/1985 | Streatfield et al. ............. 405/156 |
| 4,720,211 | 1/1988 | Streatfield et al. ............. 405/154 |
| 4,738,565 | 4/1988 | Streatfield et al. ............. 405/154 |
| 5,002,432 | 3/1991 | Dysarz ...................... 405/232 X |
| 5,048,793 | 9/1991 | Mefford et al. ................. 54/29 |
| 5,076,731 | 12/1991 | Luksch ......................... 405/154 |
| 5,078,546 | 1/1992 | Fisk et al. ...................... 405/156 |
| 5,112,158 | 5/1992 | McConnell ..................... 405/154 |
| 5,192,165 | 3/1993 | Torielli ......................... 405/156 |
| 5,207,533 | 5/1993 | Federspiel et al. ............. 405/156 |
| 5,302,053 | 4/1993 | Moriarty ........................ 405/154 |
| 5,306,101 | 4/1993 | Rockower et al. .............. 405/154 |

FOREIGN PATENT DOCUMENTS

| | | |
|---|---|---|
| 0094694 | 11/1981 | European Pat. Off. . |
| 2475805 | 2/1980 | France . |

Primary Examiner—Dennis L. Taylor
Attorney, Agent, or Firm—John W. Montgomery; Ross, Clapp, Korn & Montgomery, L.L.P.

[57] ABSTRACT

A tool and method for splitting an existing underground polymeric pipe into a plurality of strips and for expanding the strips and the surrounding ground to permit replacement of the existing polymeric pipe along its length from an entry excavation to an exit excavation without excavating entirely along the length. The tool includes a nose sized smaller than a minimum inside diameter of the existing polymeric pipe, a blade unit attached to the nose having a plurality of cutting blades extending therefrom radially outward about an imaginary central axis, each of the plurality of cutting blades having a forward opened "V" shaped cutting edge sized larger than a maximum outside diameter of the existing polymeric pipe for cutting the existing polymeric pipe into strips along the length thereof. A mandrel is attached to the nose coaxial with the blade unit having an exterior surface tapered from a front diameter, at least as small as a minimum inside diameter of the existing pipe, to a back diameter larger than the replacement pipe to be inserted, and a power device for forcing the tool through the existing pipe with sufficient force in the direction of the open "V" shaped blades to cause the polymeric pipes to be cut into strips and to cause the strips to be expanded by the mandrel to the back diameter larger than the outside diameter of the replacement pipe so that the replacement pipe can be inserted along the entire length of the pipe.

15 Claims, 2 Drawing Sheets

POLYMERIC PIPE SPLITTER, REPLACEMENT TOOL AND METHOD

TECHNICAL FIELD OF THE INVENTION

This invention relates to an apparatus for replacing an existing underground pipeline, and particularly to a device and method for splitting, expanding and replacing underground polymeric pipe without excavating along the entire length of the pipeline.

BACKGROUND OF THE INVENTION

Underground pipes and extensive underground pipeline systems have been in existence for many, many years. For a number of years, many of the underground pipe and pipeline systems have been built using plastic or polymer pipe, constructed of polymeric materials of all kinds, including polypropylene (PP), polyethylene (PE), high-density polypropylene (HDPP), high-density polyethylene (HDPE) and polyvinyl chloride (PVC), by way of example. The type of material depends upon the function and requirements of a pipeline, whether for drainage or pumping of water, sewage, gas, oil, liquid chemicals and even slurries of solid materials mixed in a fluid carrier for transport through the pipeline. These underground pipes, although highly durable, may need to be replaced, for many reasons. For example, the existing pipeline may be in poor condition due to chemical or biological degradation, wear, corrosion, ground-shifting or other destructive modalities. Modified usage requirements may require a larger pipe or might require pipe constructed of a different material, such as a particular chemically-compatible material.

The usual means for replacing pipelines has been to excavate entirely along the length of pipeline or along the section of pipeline to be replaced, remove it and replace it with appropriate, new pipe. This process is costly, labor-intensive, uses large quantities of fuels to power the construction equipment and often adversely impacts the above-ground environment, including disruption to vehicular traffic, interruption of natural wildlife habitats and has the potential of acceleration of erosion.

In the case of replacement of brittle or fracturable cast-iron water or gas mains, prior apparatuses and methods have been proposed, such as those disclosed in U.S. Pat. Nos. 4,505,302; 4,720,211; and 4,738,565, all of which were originally assigned to British Gas Corporation of England in patents issued Mar. 19, 1985, Jan. 19, 1988 and Apr. 19, 1988, respectively. These prior devices included an elongated pipe-fracturing and displacement mole having a rear cylindrical body portion and a conical front pipe-fracturing and expanding portion. Specifically, the front portion includes a fracturing means for applying an intense localized pressure outwardly against the inside of the buried pipe. The mole was forced through the existing pipeline employing a plurality of high-tensile strength cutters in the shape of tapered chisel edges formed with two elongated faces intersecting at an obtuse angle and which elongated edges are at a shallow angle relative to the axis of the mole or the pipeline to be replaced. The cutter edges expand from a small diameter shallow angle at the front of the mole to a larger diameter at the cone portion. The largest diameter defined by the cutter edges is sufficiently large to fracture the pipe but is no larger than the largest diameter of the expanding cone which is positioned immediately behind the rearward extent of the tapered edges. The devices are specifically designed for applying high, localized fracturing force to fracturable pipes.

Applicant has found that the high localized force exerting devices of the '302, '211, '565 patents do not cause fracturing of polymeric pipes of the type which are to be replaced according to the present invention. Such devices, particularly devices having cutting edges formed with elongated intersecting flat faces at an obtuse angle are not sufficiently sharp to pierce some of the polymeric pipe materials used. Fracturing is not likely to result even with some of the most rigid polymeric pipe materials, such as PVC. Polymeric pipe has not been found to be fracturable as with cast iron gas pipes and water mains for which prior devices were useful.

Other devices have previously been proposed for use in splitting or piercing metallic well casings, as in U.S. Pat. Nos. 652,367; 1,001,205; 1,519,882; 1,618,368; 2,638,165; and 2,947,253. Still other devices have been proposed for splitting and removing metallic tubing of the type sometimes used in heat exchangers, such as those depicted in U.S. Pat. Nos. 2,834,106 and 2,983,042. All of these devices use one or a plurality of cutting edges, acting outwardly against the pipe as the device is moved through the pipe. Each cutting edge, whether a fixed or movable blade, or a circular roller blade has an outwardly tapered edge tilted or angled back from the nose of the device. These devices are considered to be inadequate for splitting and replacement of polymeric pipe. A single blade cutting longitudinally along a polymeric pipe allows the resilient material to return to its circular "C" shape after the blade passes through it. The single-cut resilient pipe cannot be expanded adequately to draw a replacement pipe into it. The body of the tool and the replacement pipe are "gripped" by the collapsing "C" of the cut polymeric pipe, even using an expanding mandrel. In situations where a plurality of radially projecting blades is used, each blade angled back to present a progressively larger diameter cutting edge, it has been found that only one of the plurality of outwardly projecting back-angled blades would pierce the pipe wall. The other blades merely ride along the inside of the pipe. The first cut allows the polymeric pipe to be temporarily expanded outwardly as the other blades pass through it, and the resilient hoop tension collapses the pipe toward its prior diameter. Thus, a polymeric pipeline could not be consistently cut into a plurality of strips and could not be consistently properly expanded to allow efficient and smooth insertion of a new replacement pipe of the same or larger size or diameter.

Other devices for drawing a replacement pipe or tubing or a supplemental pipe, tubing or lining into an underground pipeline, either by expanding the ground, expanding the existing pipe or simply drawing in a smaller diameter pipe, are shown in U.S. Pat. Nos. 4,100,980; 3,181,302 and 4,003,122. None of these devices adequately address the problems associated with splitting and replacing a polymeric pipe.

Some devices were proposed for cleaning contaminates from boiler tubing or from flues by cutting out the contaminates as in U.S. Pat. Nos. 928,361 and 2,163,384, but these did not address splitting, expanding and removing such pipes. One device proposed a plurality longitudinally aligned "saw tooth" blades, each progressively cutting deeper into the pipeline wall from the inside. The wall was sufficiently weakened, without cutting entirely through it, so that its outward tension was relaxed, and removal was facilitated.

OBJECTS AND ADVANTAGES OF THE INVENTION

It is an object of Applicant's invention to overcome deficiencies of prior pipe-fracturing mole devices and further to overcome deficiencies existing in other pipe splitting and replacing devices, as well as to overcome deficiencies found by Applicant during testing and in trials of other unique and unobvious combinations of various features of prior pipe replacement devices. A polymeric pipe-splitting device is provided with a specially constructed blade unit having a plurality of blades, which unique blade unit acts in combination to split polymeric pipe into a plurality of separate strips. The plurality of separate strips are expandable into surrounding ground to provide clearance for drawing a replacement pipe non-bindingly into and substantially coaxially with the previously existing pipe.

It is an object to provide a blade construction, design and configuration which will progressively cut an underground polymeric pipe into a plurality of strip sections while continuously centering the cutting unit for coaxial traverse of an expanding mandrel through the pipe and through the strips so that a replacement pipe can be drawn into the bore of the previously existing pipeline without excavating along the entire length of an existing underground polymeric pipeline.

It is a further object of the invention to provide a blade design which has both a rearwardly angled cutting edge and a forwardly angled cutting edge which intersect at a rearward apex to provide a v-shaped cutting blade with the opening directed forward.

It is also an object to provide, in combination, a polymeric pipe-splitting, expanding and replacing device having a plurality of blades with forward "V" shaped edges for cutting through an existing pipeline along surrounding ground, and a replacement pipe is drawn into the existing bore without excavating from the surface along the length of pipeline.

It is a further object of the invention to provide a polymeric pipe splitter for a small diameter, or a small wall thickness, pipe which can be drawn through the previously existing pipe with a cable and winch.

It is a further object of the invention to provide a device for splitting polymeric pipe for a large diameter, or large wall thickness, pipe, which device is capable of being drawn with a cable and winch, but which further has a reciprocating impact device or hammering device to increase the cutting effectiveness of the blade and to increase the expanding effectiveness of the expanding mandrel as the device is drawn through the pipeline with a winch and cable and simultaneously impacted with the hammering device.

BRIEF DESCRIPTION OF THE DRAWINGS

These and other objects and advantages of the invention will become more fully understood with reference to the following detailed description, claims and drawings, in which like numerals represent like elements and in which:

DETAILED DESCRIPTION OF THE PREFERRED EMBODIMENTS

Figure 1:
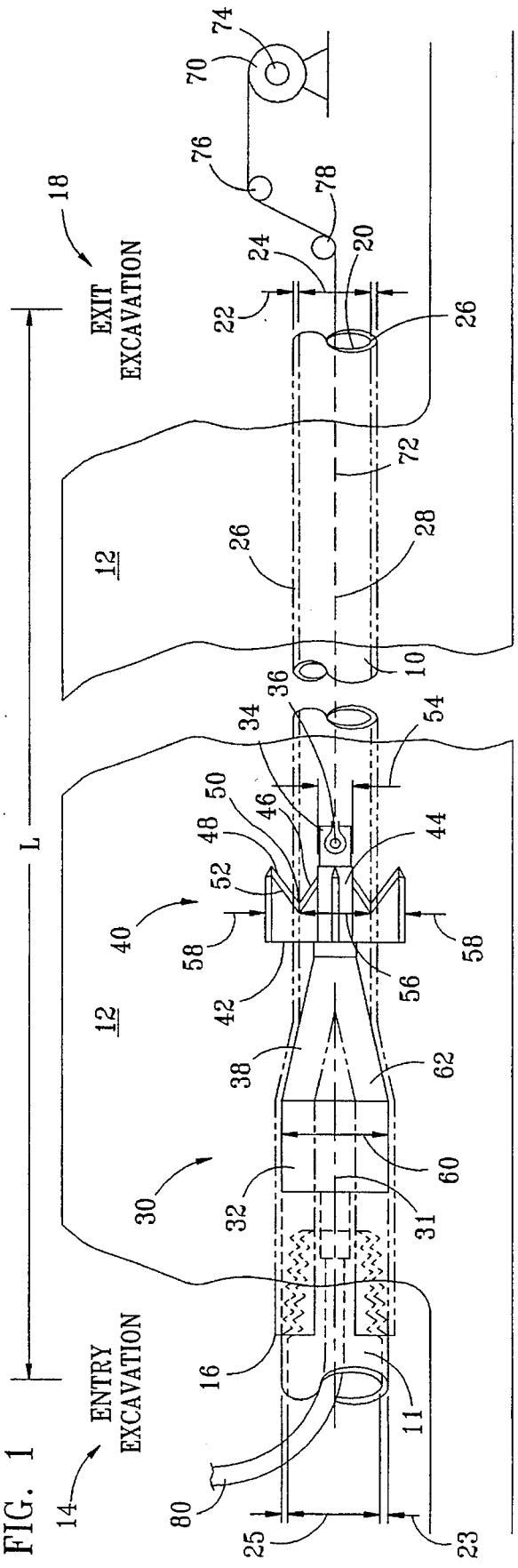
FIG. 1 is a schematic side elevation view of a polymeric pipe splitting and expanding tool shown in use in the replacement of an existing length of pipe using an entrance excavation and an exit excavation without excavating to reach the pipe entirely along its length (L)

FIG. 1 depicts a schematic side view of an existing pipe 10, under ground 12, extending the length (L) from an entry excavation 14 where an entry end. 16 of pipe 10 is exposed to an exit excavation 18 where an exit end 20 of pipe 10 is exposed. Pipe 10 is a polymeric pipe, such as may be constructed from polyethylene, polypropylene, polyvinyl chloride, high or low density polyethylene or polypropylene, or the like, polymeric materials. Pipe 10 has a maximum outside diameter 22 and a minimum inside diameter 24 into the underground pipelines 10, which extend and may have varying thicknesses of wall 26, which are positioned substantially uniformly in a radial direction about a central axis 28.

The tool, generally designated as 30, for replacing the underground pipeline 10 with a replacement pipe 11 includes a cylindrical body 32, having a central axis 31, which is coaxially alignable with axis 28 of pipe 10. Cylindrical body 32 is attached to a nose portion 34 having a table attachment means 36 affixed thereto. A first expanding mandrel 38, which has a frusto conical exterior surface, tapers outward from a small diameter, less than the minimum inside diameter 24, adjacent to the nose portion 34 to a large diameter adjacent to the body 32.

Figure 3:
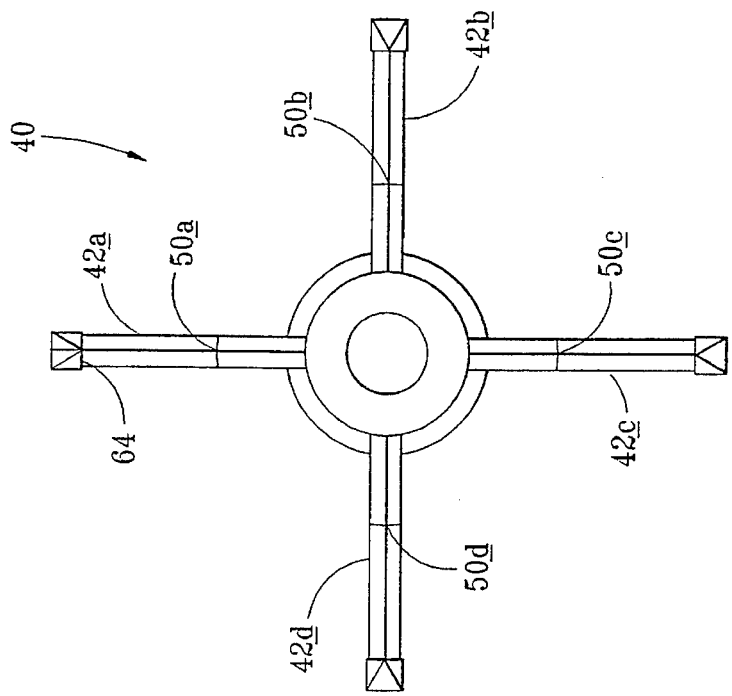
FIG. 3 is a front end view of the replaceable cutting blade unit of FIG. 2.
Figure 2:
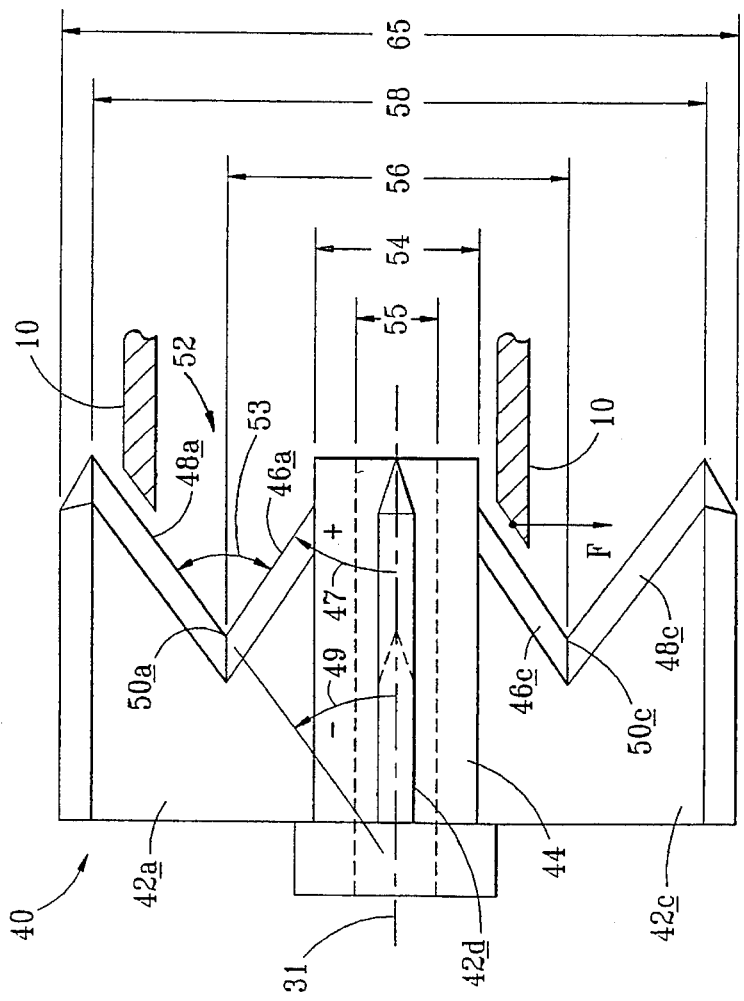
FIG. 2 is a side elevation view of a replaceable cutting blade unit for attachment to the mandrel according to the present invention.

Securely attached to tool 30 is a blade unit 40. The blade unit 40 is uniquely constructed for splitting polymeric pipe into a plurality of strips 62, as will be more fully described below with reference to FIG. 2. The unique construction of blade unit 40 and the operation thereof may be more fully understood with reference to FIGS. 2 and 3 in conjunction with FIG. 1. FIG. 2 depicts an enlarged side view of the blade unit 40, and FIG. 3 depicts an enlarged front end view of the blade unit 40. Each of the radially extending blades 42a, b, c and d is preferably constructed substantially identical and uniformly spaced circumferentially around hub 44 to provide uniform pipe splitting. Each blade 42a, b, c and d is secured affixed to blade unit hub 44 and is advantageously formed with a back angle edge portion 46, which forms a positive clockwise angle 47 with respect to axis 31 and which intersects with a forward-angled cutting edge portion 48, which forms a negative counterclockwise angle 49 with respect to axis 31. The edge portions 46 and 48 intersect at an apex 50 so that a front-opening, "V" shaped cutting edge 52 is formed having a forward-opening angle 53 between back-angled edge portion 56 and forward-angled edge portion 48. The outside diameter 54 of hub 44 is smaller than the minimum inside diameter 24 of the pipe 10 which is to be replaced. There is an inside opening 55 through hub 44 sized for replaceable engagement over nose portion 34 of tool 30.

In the embodiment shown, opening 55 is a circular opening corresponding to a cylindrically shaped nose 34. Other shapes may be used without departing from the invention. Also, it is to be recognized that while a cylindrical exterior hub 44 having a diameter 54 is preferred, other shapes could also be used, such as a polygon cross-section (for example, a square shape), with each blade 42 radially extending from the outside flat surface of the polygon (for example, four blades, one each extending perpendicularly from each flat side of a square, not shown).

Blade portion 46 extends from a minimum diameter 54, which is less than the minimum inside diameter 24 of pipe 10 to be replaced outward to the apex diameter 56 defined by the radial positions of each apex 50a, b, c and d (as shown in FIG. 3). Forwardly angled blade portion 48 extends outwardly to a diameter 58, which is at least larger than the maximum outside diameter 22 of pipe 10 to be replaced. The apex diameter 56 falls between diameters 54 and 58 and is preferably a measurement falling between the minimum inside diameter 24 and the maximum outside diameter 22 of pipe 10. This advantageously facilitates slicing the polymeric pipe 10 partially with edge 46 and partially with edge 48 in the proximity of apex 50. Thus, cutting at apex 50 of each blade is preferred for maximum effectiveness of the polysplitter according to the present invention.

It has been found, however, that pipes 10 having outside diameters less than diameter 58 and inside diameters greater than diameter 54 can also be split along each of the blades 42a, b, c and d. It has been found that in the event during operation axis 31 moves off-center from coaxial alignment with axis 28 of pipe 10 (as, for example, blade 40 moving downward with respect to axis 28 so that pipe 10 has cutting contact with blade 48a and the opposite side with blade 46c). Thus, a downward component of frictional force results against the pipe with an equal reaction against the cutter unit 40 such that the blade unit will tend to move back into axial alignment with the pipe 10. In this manner, the unique forward "V" shape of the cutting edge 52, which is formed in blades 42, results in a blade which is uniquely and unobviously advantageous for use in splitting polymeric pipe. The hub 44 acts as a barrier wall to keep the blade unit 40 from moving too far off-center and from disengaging any of the blades while the natural frictional cutting forces act to center the blade unit while cutting. Similarly, exterior guides 64 may be attached along each blade 42 at a predetermined exterior diameter 65 to serve both to limit radial movement and also to reinforce the outermost edges of blades 42 as they move through the ground 12 surrounding the pipe 10.

It has been found that typically, with a plurality of back-angle blades, only one blade would pierce the polymeric pipe. This relieves the hoop tension at the pierce location. Without inward pressure on all of the other blades, the cutting edges simply dragged or slid along the inside of the pipe without cutting entirely through it except at one of the blade sites. This left the existing pipe 10 in a "C" configuration, which collapsed upon itself and could not be non-bindingly expanded with mandrel 58. Applicant's "V" shaped blades uniquely overcome the observed problem.

Figure 4:
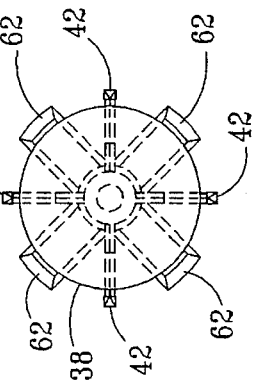
FIG. 4 is a schematic back end view showing the entry end of the pipe to be replaced, the polymeric pipe splitting and expanding tool of FIG. 1 inserted into the entry end of the pipe to be split and further showing both the plurality of strips into which the polymeric pipe is split and the expansion of those strips for insertion of a replacement pipe according the invention.

With reference to FIG. 4, the resulting multiple strip splitting of polymeric pipe 10 is schematically depicted in which uniform strips 62 of pipe 10 are cut with the forward-opening "V" blades 42 of blade unit 40. Each of these strips 62 is then expanded into the surrounding ground 12 as it passes over mandrel 38. Without being interconnected with the other strips 62, there is no elastic or resilient tension within the pipe 10 to cause it to collapse. Mandrel 38 need only compress each of the strips 62 into the surrounding ground 12 such that there is adequate clearance for a replacement pipe 11; replacement pipe 11 may be attached to cylindrical body 32, as with threaded engagement, as schematically depicted or otherwise, for the replacement of the pipe 10 with pipe 11 according to the present invention. Pipe 11 can thus be of equal size to pipe 10 so that the capacity is not adversely affected for the pipeline or may be larger than pipe 10 to improve capacity or to improve strength as needed.

Tool 30 is conveniently pulled through small diameter pipes with a winch 70 positioned in or adjacent to exit excavation 18. A pull cable 72 is attached at 36 to the nose of the tool 30. A motor 74 may, for example, turns a coil of cable 72 on winch 70. The cable 74 extends over rigidly secured direction changing transfer pulleys 76 and 78 to allow alignment of cable 72 with axis 28 for efficient non-binding operation.

Figure 5:
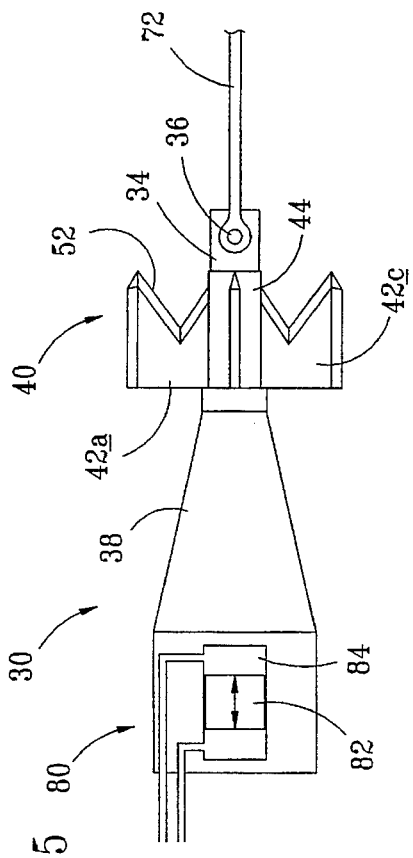
FIG. 5 is a schematic side view of the polymeric pipe splitting and expanding tool according to one embodiment of the invention in which a reciprocating pneumatic impact hammer is shown engaged within an expanding mandrel, which expanding mandrel has a replaceable cutting blade unit engaged thereon.

In the event that a cable 72 and winch 70 do not have adequate pulling power as with either a large diameter pipe 10, or alternatively, a pipe 10 having a substantially thick wall 26, then additional cutting force may be advantageously applied with a reciprocating impact hammer 80 as shown in FIG. 5.

FIG. 5 depicts a schematic side view and partial cross-section of a polymeric pipe splitting and expansion tool 30, having a body 32, expansion mandrel 38 and a cutting blade unit 40 as described previously. Also depicted is a reciprocating impact hammer 80, which may, for example, be comprised of a pneumatically-operated reciprocating piston mass 82 within an axially aligned cylinder 84. Appropriate pressure lines 86 and 88 may be threaded through entrance opening 16 as the polymeric pipe-splitting tool 30 is pulled therethrough with tension on pull cable 72, as described above. In this manner, each time the reciprocating piston 82 impacts in the direction of the tension, additional cutting force is placed on forward-opening cutting edges 52 so that even substantial size or substantial thickness polymeric pipes can be conveniently and substantially continuously split and expanded according to one embodiment of the present invention.

Thus, what has been disclosed is an advantageous polymeric pipe-splitting and expansion tool having a uniquely constructed blade unit 40 designed particularly for splitting polymeric pipe into a plurality of continuous strips. The strips are subsequently expanded with the use of tapered or conical mandrel, and a replacement pipe may be immediately reinserted or pulled into the opening formed with the inventive tool.

Other alterations and modifications of the invention will likewise become apparent to those of ordinary skill in the an upon reading the present disclosure, and it is intended that the scope of the invention disclosed herein be limited only by the broadest interpretation of the appended claims to which the inventors are legally entitled.

What is claimed is:

1. A tool for use in the replacement of an existing underground polymeric pipe with a replacement pipe, said existing pipe having a central axis, a minimum inside diameter, a maximum outside diameter and a length extending in a forward direction from an entry excavation to an exit excavation and said replacement pipe having a longitudinal axis along a length corresponding to said length of said existing pipe and a maximum outside diameter larger than said minimum inside diameter of said existing pipe, said tool comprising:

(a) a mandrel having a frusto conical exterior surface radially expanding about a central axis, from a front diameter at least as small as said minimum diameter of said existing polymeric pipe to a back diameter at least as large as said maximum outside diameter of said replacement pipe;

(b) a blade unit attached to said mandrel ahead of said mandrel in said forward direction, said blade unit including a hub having a diameter smaller than said minimum diameter of said existing pipe and having a plurality of radially projecting blades, each of said blades having a front-opened "V" shaped cutting edge forward of said frusto conical exterior surface of said mandrel, which front-opened "V" shaped cutting edge comprises a back-angled portion extending from a diameter at least as small as said minimum diameter of said existing polymeric pipe to an apex of said "V" shaped blade cutting edge and a forward-angled portion intersecting with said back-angled portion extending from said apex of said "V" shaped cutting edge forward and outward to an outside diameter at least as large as said maximum outside diameter of said existing polymeric pipe, so that said plurality of blades advantageously maintain engagement with said existing polymeric pipe to cut said existing polymeric pipe into strips; and (c) means for moving said mandrel and said attached blade unit through said existing pipe with sufficient force for said plurality of blades with said front-opened "V" shaped cutting edges to cut said existing polymeric pipe into strips and for said frusto conical exterior surface of said mandrel to expand said strips to allow said replacement pipe to be inserted along said length of previously existing pipe.

2. A tool for use in the replacement of an existing underground polymeric pipe as in claim 1 wherein said apex of each of said plurality of blades is at a predetermined position such that opposed apexes of opposed blades define a diameter which is greater than the minimum inside diameter of said polymeric pipe to be replaced and less than the maximum outside diameter of said polymeric pipe to be replaced.

3. A tool for use for use in the replacement of existing underground polymeric pipes as in claim 1 wherein said means for moving said mandrel and blade unit through said existing pipe further comprises:

(a) a motorized winch anchored in or anchored adjacent to said exit excavation; and (b) a pull cable fastened to said tool between said mandrel and said winch so that said tool may be moved by said winch and cable through the pipe.

4. A tool for the replacement of an existing underground polymeric pipe as in claim 1 further comprising a reciprocating hammer device attached to said mandrel and attached to said blade unit for periodically impacting said tool with an applied force in the forward coaxial direction for driving said blade unit and mandrel forward along said existing polymeric pipe causing said blade unit to cut said existing polymeric pipe into continuous strips, which strips are expanded by said frusto conical surface of said mandrel.

5. A tool for splitting an existing underground polymeric pipe into a plurality of strips and for expanding said strips and surrounding ground to permit replacement of a length of said existing polymeric pipe from an entrance opening at an entry excavation to an exit at an exit excavation without excavating entirely along said length of said pipe, said tool comprising:

(a) a nose sized smaller than a minimum inside diameter of said existing polymeric pipe;

(b) a blade unit attached to said nose having a plurality of cutting blades extending therefrom radially outward about an imaginary central axis, each of said plurality of cutting blades, each having a forward opened "V" shaped cutting edge, the positioning and radial outward extent of said plurality of cutting blades defining a diameter larger than a maximum outside diameter of said existing polymeric pipe for advantageously maintaining engagement for cutting said existing polymeric pipe into strips along said length thereof;

(c) a mandrel attached to said nose coaxial with said blade unit having an exterior surface tapered from a front diameter at least as small as a minimum inside diameter of said existing pipe to a back diameter larger than said replacement pipe to be inserted; and (d) means for moving said tool through said existing pipe with sufficient force in the direction of said open "V" shaped blades to cause said polymeric pipes to be cut into strips and to cause said strips to be expanded by said mandrel to said back diameter larger than said outside diameter of said replacement pipe so that said replacement pipe can be inserted along said entire length of the pipe.

6. A tool for splitting an existing underground polymeric pipe as in claim 5 wherein said blade unit comprises a replaceable unit having a hole along a central axis sized for slipping on or off of said nose to permit convenient replacement of said blade unit.

7. A tool for splitting an existing underground polymeric pipe into a plurality of strips and for expanding said strips and surrounding ground to permit replacement of a length of said existing polymeric pipe from an entrance opening at an entry excavation to an exit at an exit excavation without excavating entirely along said length of said pipe, said tool comprising:

(a) a nose sized smaller than a minimum inside diameter of said existing polymeric pipe;

(b) a blade unit comprising a replaceable unit having a hole along a central axis sized for slipping on or off of said nose to permit convenient replacement of said blade unit and thereby attached to said nose, said blade unit having a plurality of cutting blades extending therefrom radially outward about an imaginary central axis, each of said plurality of cutting blades, each having a forward opened "V" shaped cutting edge, the positioning and radial outward extent of said plurality of cutting blades defining a diameter larger than a maximum outside diameter of said existing polymeric pipe, each of said plurality of blades having forward-opened "V" shaped blades with apexes of said "V" shaped blades formed by the intersection of two angled edge portion of said blades such that the position of said apexes of said replaceable blades approximates an average diameter of an existing polymeric pipe size such that the user may selectably attach an appropriate size blade unit for a particular size of polymeric pipe to be split for cutting said existing polymeric pipe into strips along said length thereof;

(c) a mandrel attached to said nose coaxial with said blade unit having an exterior surface tapered from a front diameter at least as small as a minimum inside diameter of said existing pipe to a back diameter larger than said replacement pipe to be inserted; and (d) means for moving said tool through said existing pipe with sufficient force in the direction of said open "V" shaped blades to cause said polymeric pipes to be cut into strips and to cause said strips to be expanded by said mandrel to said back diameter larger than said outside diameter of said replacement pipe so that said replacement pipe can be inserted along said entire length of the pipe.

8. A tool for splitting an existing underground polymeric pipe as in claim 5 wherein each of said plurality of "V" shaped cutting edges defines an apex evenly spaced radially outward from an imaginary axis of said tool, said apex diameter approximating the average diameter of said existing polymeric pipe, which average diameter is halfway between a minimum side diameter and a maximum outside diameter of said existing polymeric pipe.

9. A tool for splitting an existing underground polymeric pipe as in claim 5 wherein said means for forcing said tool through said existing pipe comprises:

(a) a pull cable attached to said nose and extending along the length of said pipe; and (b) a motor-driven winch secured to said pull cable adjacent an exit end of said existing polymeric pipe for drawing said tool through said existing polymeric pipe with sufficient force for splitting said polymeric pipe into segments separated by said forward-opened "V" shaped blades and for expanding said split pipe segments outwardly along said mandrel to said back diameter thereof larger than said replacement pipe to be inserted.

10. A tool for splitting an existing underground polymeric pipe as in claim 9 further comprising a reciprocating pneumatic hammer attached to said tool for impacting said tool in a reciprocating fashion coaxially with said tool and with said pipe to be split.

11. A tool for splitting an existing underground polymeric pipe as in claim 6 wherein said replaceable blade unit comprises a plurality of cutting blades that are replaceable, each of said plurality of blades having forward-opened "V" shaped blades with apexes of said "V" shaped blades formed by the intersection of two angled edge portions of said blades such that the position of said apexes of said cutting blades approximates an average diameter of an existing polymeric pipe size such that the user may selectably attach an appropriate size blade unit for a particular size of polymeric pipe to be split.

12. A method for the replacement of an existing underground polymeric pipe with a replacement pipe, said existing pipe having a central axis, a minimum inside diameter, a maximum outside diameter and a length extending in a forward direction from an entry excavation to an exit excavation and said replacement pipe having a longitudinal axis along a length corresponding to said length of said existing pipe and a maximum outside diameter larger than said minimum inside diameter of said existing pipe, said method comprising the steps of:

(a) a mandrel having a frusto conical exterior surface radially expanding about a central axis, from a front diameter at least as small as said minimum diameter of said existing polymeric pipe to a back diameter at least as large as said maximum outside diameter of said replacement pipe;

(b) forming a blade unit including a hub having a diameter smaller than said minimum diameter of said existing pipe and having a plurality of radially projecting blades, each of said blades having a front-opened "V" shaped cutting edge forward of said frusto conical exterior surface of said mandrel, which front-opened "V" shaped cutting edge comprises a back-angled portion extending from a diameter at least as small as said minimum diameter of said existing polymeric pipe to an apex of said "V" shaped blade cutting edge and a forward-angled portion intersecting with said back-angled portion extending from said apex of said "V" shaped cutting edge forward and outward to an outside diameter at least as large as said maximum outside diameter of said existing polymeric pipe;

(c) attaching said blade unit to said mandrel, ahead of said mandrel, in a forward direction; and (d) moving said mandrel and said attached blade unit through said existing pipe with sufficient force for said plurality of blades with said front-opened "V" shaped cutting edges to cut said existing polymeric pipe into strips and for said frusto conical exterior surface of said mandrel to expand said strips to allow said replacement pipe to be inserted along said length of previously existing pipe.

13. A method for the replacement of an existing underground polymeric pipe as in claim 12 wherein said step of forming said blade unit includes positioning apex of each of said plurality blades at a predetermined position such that opposed apexes of opposed blades define a diameter which is greater than the minimum inside diameter of said polymeric pipe to be replaced and less than the maximum outside diameter of said polymeric pipe to be replaced.

14. A method for the replacement of existing underground polymeric pipes as in claim 12 wherein said step of moving said mandrel and blade unit through said existing pipe further comprises:

(a) anchoring said motorized winch in or adjacent to said exit excavation; and (b) fastening a pull cable to said tool between said mandrel and said winch so that said tool may be moved by said winch and cable through the pipe.

15. A method for the replacement of an existing underground polymeric pipe as in claim 12 wherein said step of moving said mandrel and attached blade unit through said existing pipe further comprises the step of reciprocating a hammer device attached to said mandrel and attached to said blade unit for periodically impacting said tool with an applied force in the forward coaxial direction for driving said blade unit and mandrel forward along said existing polymeric pipe causing said blade unit to cut said existing polymeric pipe into continuous strips, which strips are expanded by said frusto conical surface of said mandrel.

* * * * *

UNITED STATES PATENT AND TRADEMARK OFFICE
CERTIFICATE OF CORRECTION

PATENT NO. : 5,544,977
DATED : August 13, 1996
INVENTOR(S) : Jerald A. Cravy, et al.

It is certified that error appears in the above-indentified patent and that said Letters Patent is hereby corrected as shown below:

On the title page item [56],

In the References Cited -- U.S. Patent Documents:

| | | | | |
|---|---|---|---|---|
| Replace: | 2,628,165 | 5/1953 | Barber | 164/0.3 |
| With: | 2,638,165 | 5/1953 | Barber | 164/0.3 |

Column 6, Line 53 --

Replace:   ... skill in the an ...

With:   ... skill in the art ...

Signed and Sealed this

Fifteenth Day of October, 1996

Attest:

BRUCE LEHMAN

*Attesting Officer*   *Commissioner of Patents and Trademarks*